United States Patent [19]
Gutmann

[11] 3,729,218
[45] Apr. 24, 1973

[54] BUTT JOINING OF STEEL BARS AND CONNECTION ASSEMBLY THEREFOR

[76] Inventor: Siegfried Gutmann, Schwarzwaldstrasse 45, 76 Offenburg, Germany

[22] Filed: Aug. 20, 1970

[21] Appl. No.: 65,502

Related U.S. Application Data

[63] Continuation-in-part of Ser. No. 690,214, Feb. 13, 1967, Pat. No. 3,551,999.

[30] Foreign Application Priority Data

Dec. 6, 1967 Austria..........................A 11039/67

[52] U.S. Cl................................287/109, 24/123 W
[51] Int. Cl.......................................F16b 7/00
[58] Field of Search.........................287/109, 78; 24/123 W, 115 A

[56] References Cited

UNITED STATES PATENTS

| | | | |
|---|---|---|---|
| 2,490,809 | 12/1949 | Holke | 287/109 |
| 650,860 | 6/1900 | McTighe | 287/78 X |
| 3,551,999 | 1/1971 | Gutmann | 287/109 |

FOREIGN PATENTS OR APPLICATIONS 1,044,465  9/1966  Great Britain........24/123 W

*Primary Examiner*—Andrew V. Kundrat
*Attorney*—Flynn & Frishauf

[57] ABSTRACT

To butt join steel bars and maintain any tightly abutting, or accurately spaced position of the bars to be joined, wires of high tensile strength (such as piano-type wires and the like) are located right next to the rod to be joined, the entire assembly then being surrounded by a tubular sleeve which is compressed and cold flowed over the wires and the rods to be joined together; compressive force can be reduced by forming spaced upstanding ridges on the sleeve, the compressive force being applied only against the ridges. The space bridging the ends of the rods to be joined is left free of compression ridges.

11 Claims, 5 Drawing Figures

BUTT JOINING OF STEEL BARS AND CONNECTION ASSEMBLY THEREFOR

CROSS REFERENCE

U.S. application Ser. No. 690,214, of which the present application is a continuation-in-part, filed Feb. 13, 1967 and now U.S. Pat. No. 3,551,999, granted Jan. 5, 1971.

The present application, with respect to FIGS. 1-4 hereof, is a continuation-in-part application of the prior application Serial 690,214 and now Patent No. 3,551,999.

The present invention relates to a butt joint to splice steel rods together, and to a connection assembly to make the butt joint, and more particularly to a type of joint and connection assembly in which a tubular sleeve of a material somewhat softer than the steel rods to be joined is cold flowed thereover to non-removably and tightly join the rods together.

Butt joints of steel rods, particularly when used to join together rods to be embedded in cement to form reinforced concrete should be so joined that the total overall length of the two rods to be joined does not change when the splice is made. The aforementioned application Ser. No. 690,214 (now U.S. Pat. No. 3,551,999) discloses and claims a method, according to which the end pieces of the rods to be joined are tightly held against each other, so that the overall length will not change. It may happen, however, that the ends cannot, or should not be tightly placed against each other, due to the arrangement of the rods themselves, or to extend the length of both rods by a small, additional amount. Avoiding changes in length of reinforcing rods which are to be spliced together is particularly important when partially pre-cast reinforced cement blocks are to be joined together at exposed points of the reinforcing rods.

It has been found in actual practice that merely enclosing reinforcing rods with a tubular sleeve, and cold-working the tubular sleeve by cold flowing the material over the reinforcing rods does not provide the desired result, since, upon cold flowing the sleeve, a certain axial component of pressure can be applied to the sleeve so that a gap will form between abutted ends of the sleeve, which gap will have an uncontrollable length. If the rods already are spaced by a slight amount, for example by being accurately pre-located, or have a spacer placed therebetween, then the relative axial location of the ends of the rods may still change by an uncontrollable amount.

It is an object of the present invention to form an end-to-end, or butt joint of steel rods in which the overall length of the rods to be joined will not change, and to provide a connection assembly to make such a joint.

SUBJECT MATTER OF THE PRESENT INVENTION

Briefly, a plurality of wire-like rods, or wires (hereinafter referred to, collectively, only as wires) of high tensile strength material, such as piano wire or the like, are interposed between the rods to be spliced, and the tubular sleeve placed thereover, and then the tubular sleeve is deformed; preferably, the wires are of the same length, or slightly longer, so that upon deformation the ends of the tubular sleeve will cold flow over the ends of the wires, gripping in tight contact the rods to be spliced as well as the wires themselves.

The present invention is based on the realization that, upon cold flowing, the material of the sleeve deforms in longitudinal as well as in transverse direction; during the longitudinal deformation, the wires interposed between the rods to be joined and the sleeve form, what may be termed a sliding surface or buffer zone for the cold flowing sleeve material which, due to the presence of the wires, will not carry along the rods to be joined beneath the wires. Thus, the rods to be joined beneath the wires do not change their relative position in axial direction. Additionally, the steel wires increase the tensile, as well as compressive and bending strength of the joint without measurably or objectionably increasing the axial dimension of the joint being formed.

In accordance with a feature of the invention, outer ribs, for example circumferential rings can be formed on the sleeve, compressive force pressure being applied against these ribs. The zone between the ends of the rods to be spliced is free of ribs. It has been found that the pressure at the inner surface of the tubular sleeve increases upon application of pressure to the ribs only, without increased overall compressive force being necessary to cold flow the sleeve material itself.

The invention will be described by way of example with reference to the accompanying drawings, wherein.

Figure 1:
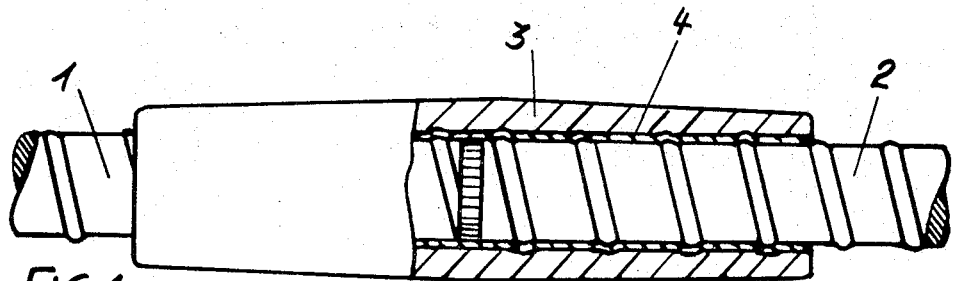
FIG. 1 is a longitudinal, partially sectional view of a joint in accordance with the present invention.

The invention is being described with reference to joining reinforcing bars or rods, to be used with reinforced concrete. It is frequently necessary to join reinforcing bars or rods directly at a construction site and to manufacture a junction which has tensile, compressive, and bending strength commensurate with that of the un-spliced rods themselves, without changing the overall dimension of two rods to be joined, or keeping the overall length of the two rods to be joined, together with a small gap, at a constant and predetermined amount. As illustrated in FIG. 1, a pair of rods 1, 2, to be joined, are surrounded by a tubular sleeve 3, of double-conical outer form, the major diameter of the cone being approximately in the region of the ends of the rods 1, 2, to be joined together. These rods may be butted tightly against each other, or can be spaced with a predetermined gap; or, a spacer element to determine the amount of the gap can be placed between the rods.

Figures 3, 4:
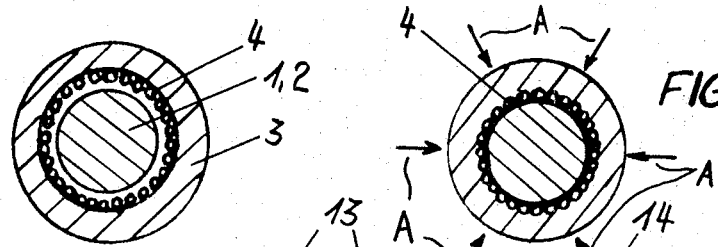
FIG. 3 is a transverse cross-sectional view of the joint before compression.
FIG. 4 is a transverse cross-sectional view of the joint after compression.

A plurality of small rod-like wires 4 are interposed between the rods 1, 2 and tubular sleeve 3; they bridge the gap, if any, between rods 1, 2 and have a length approximately equal to that of the sleeve 3, before deformation. They may be slightly shorter, of about the same size, or slightly longer. The number of these rods is just sufficient to cover the outer surface of the reinforcing rods 1, 2, to be spliced together, or the inner surface of tubular sleeve 3 before deformation (see FIG. 3). Upon application of a compressive force against the circumference of the sleeve 3, as illustrated by arrows A (FIG. 4), the material of the sleeve 3 will cold flow around the steel wires 4, which will be pressed against and follow the profile of the reinforcing bars 1, 2 (see FIGS. 1, 4) and securely press the steel wires 4 against the reinforcing rods 1, 2; simultaneously, these wires act as a sliding or slipping surface for the material of sleeve 3 which flows thereabout and prevents relative change of position of the two reinforcing rods 1, 2, with respect to each other, and more particularly an axial movement away from each other, that is tending to form a gap between the rods, or to increase any pre-existing and measured gap. When the sleeve 3 is completely cold flowed, the wires will prevent any additional change of position of the two rods 1, 2, with respect to each other due to external loading. The deformed wires, upon cold flowing of the sleeve, are tightly covered and embedded in the sleeve material which, itself, and through the entire length of the sleeve will penetrate any spaces between the wires themselves and tightly grip their surfaces. A suitable material for the wires 4 is a high tensile strength steel, for example of a strength of 200 kg/mm$^2$; such material has been found suitable and increases the strength of the junction considerably.

The compressive force, that is the die used to compress the tubular sleeve together preferably has an inner shape to provide for the double-conical form illustrated in FIG. 1.

Figure 2:
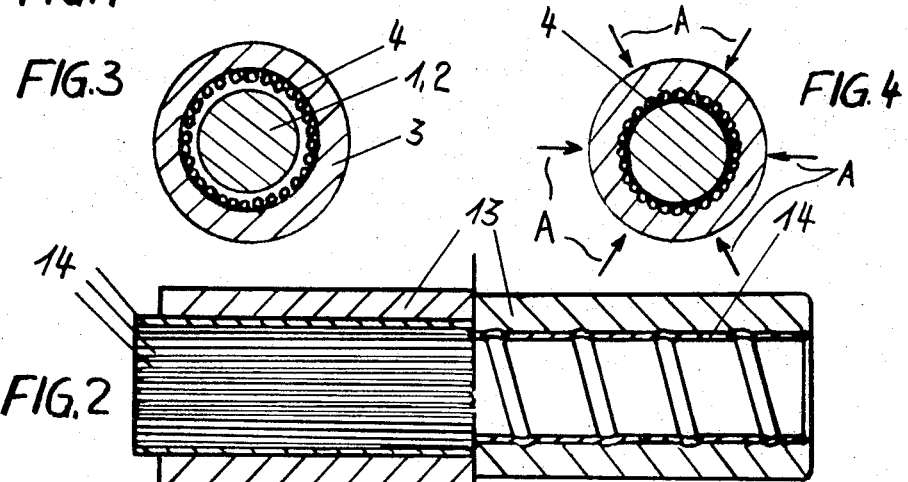
FIG. 2 is a longitudinal cross-sectional view of a connection assembly, the left side being shown before deformation and the right side after deformation; the rods to be joined have been omitted from this drawing.

FIG. 2 illustrates, in cross-sectional view, at the left-hand side a sleeve 13 with inserted steel wires 14, before deformation. As seen, the steel wires are slightly longer than the sleeve 13. Upon deformation, as seen on the right-hand side of FIG. 2, the ends of the sleeve 13 will flow over the steel wires 14, which have been deformed to assume the shape of any ridges, or grooves formed in the reinforcing bars (not shown and omitted from FIG. 2). The steel wires 14, themselves, did not change in length. If rods are to be placed in butt end alignment into the sleeve of FIG. 2, the two rods would butt against each other along the center line C. The steel wires can readily accept the outside contour of the rods 1, 2 to be spliced since their diameter is selected to be small with respect to the diameter of the rods to be joined, as clearly appears from FIGS. 3 and 4.

Figure 5:
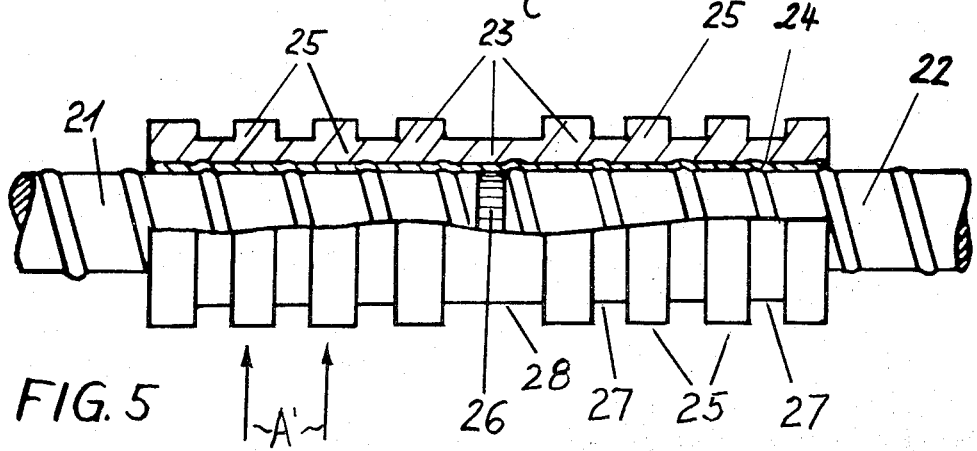
FIG. 5 is a longitudinal view, partly in section, of an additional embodiment of the present invention.

A connection which has been found particularly suitable is illustrated in FIG. 5, in which a sleeve 23 is formed with projecting ribs 25, formed, preferably, as circumferential rings. Rods 21, 22 to be joined are separated by a predetermined gap 26. The ribs 25 are separated from each other by rib-free zones 27; a central rib-free zone 28 is provided which bridges the gap 26 between the ends of the rods 21, 22 to be joined, and the wires 24, inserted between sleeve 23 and rods 21, 22. Compressive force is applied by a pressure tool against the ribs 25, as schematically illustrated by arrows A' (with respect to a few of the ribs only, for simplicity of the drawing). The compressive force is concentrated. As experiments have shown, the total power required to obtain a complete and tight joint of rods 21, 22 by cold flowing the material of the sleeve 23 is substantially reduced and, additionally, the wires 24 are particularly well deformed to match the circumference of rods 21, 22. The gap 26, bridged by the wires 24 is accurately maintained, so that the overall length of rods 21, 22, and the gap 26 will remain unchanged and the formation of the joint, including the surrounding compression sleeve does not change any predetermined and desired dimensions.

The compression of the sleeve, with the interposed wires 4 (FIG. 1), 14 (FIG. 2) or 24 (FIG. 5) can be carried out in steps — by first compressing one side, for example to the left of the central zone of the sleeve, and then by compressing the sleeve at the other side of the central zone. Insertion of the wires 4, 14, 24 effectively prevents any change in relative position of the inserted rods, even if compression is done in stages.

I claim:

1. Butt joint to splice rods located in end alignment with the ends being spaced by a gap (26) comprising
    a plurality of wires (4, 14, 24) of high tensile strength material placed adjacent said rods (1, 2, 21, 22) to be spliced and bridging the gap (26) between the ends of said rods, said wires extending beyond the gap and substantially parallel to said rods;
    and a tubular sleeve (3, 13, 23) of deformable material extending over said wires and being compressed and cold flowed over said wires and said rods to be spliced and tightly gripping said rods and said wires.

2. Joint according to claim 1, wherein said tubular sleeve is slightly double-conical, with the major diameter of the cone lying approximately over the region of the ends of said rods to be spliced together.

3. Joint according to claim 1, wherein said wires have their approximate midpoint at the ends of said rods and beneath said sleeve and extend essentially in parallel to both said rods.

4. Joint according to claim 1, wherein said wires have a diameter small with respect to the diameter of the rods to be joined;
    and a sufficient number of said wires are provided to essentially totally cover the circumference of said rods to be joined.

5. Joint according to claim 1, wherein said tubular sleeve has an outer surface, said outer surface being formed with projecting ribs overlying said rods and leaving a rib-free zone (28) in the region of the sleeve bridging the gap between the ends of said rods, said ribs (25) having the compressive force (A') applied thereto during cold flowing;
    whereby, upon application of pressure to cold flow said sleeve against the rods, direct pressure will not be applied to the zone overlying the ends of said rods tending to change the gap between the ends of said rods during said cold flowing.

6. Joint according to claim 1, wherein said sleeve is cold flowed over the ends of the wires and against the rods to be spliced together.

7. Connection assembly to form the connection of claim 1, said connection assembly comprising
    a tubular sleeve having a length which is large with respect to the gap between the rods and a plurality of high tensile strength wires of a diameter small with respect to the inner diameter of the sleeve and of similar length as the axial length of the sleeve to bridge the gap between said rods and lie parallel to and alongside the rods beneath the sleeve, and of sufficient number to approximately cover the inner surface of said sleeve.

8. Assembly according to claim 7, wherein said tubular sleeve is formed with ring-like ribs (25) at its outer surface, said ribs lying on both sides of a median zone (28) of said sleeve and adapted to overly the ends of the rods to be joined together, so that the zone (28) overlying the ends of said rods will be free of ribs;

whereby, upon application of pressure to cold flow said sleeve, against said ribs, direct pressure will not be applied to the zone overlying the ends of said rods and tending to change the gap between the ends of said rods during cold flowing.

9. Butt joint to splice rods located in end alignment comprising a plurality of wires (4, 14, 24) of high tensile strength material placed adjacent said rods 1, 2, 21, 22 to be spliced and bridging the ends of said rods;

and a tubular sleeve (3) of deformable material extending over said wires and being compressed and cold flowed over said wires and said rods to be spliced, and tightly gripping both said rods and said wires, said tubular sleeve being slightly double-conical with the major diameter of the cone lying approximately over the region of the ends of said rods to be spliced together.

10. Joint according to claim 9, wherein said wires have their approximate midpoint at the ends of said rods and beneath said sleeve and extend essentially in parallel to each other.

11. Connection assembly to form the connection of claim 9, said connection assembly comprising a tubular sleeve of slightly double-conical form with the major diameter of the cone lying approximately over the region of the ends of the rods to be spliced together, and having a length which is large with respect to its diameter;

and a plurality of high tensile strength wires of a diameter small with respect to the inner diameter of the sleeve and of similar length as the axial length of the sleeve to bridge the ends of said rods and lie parallel to and alongside the rods beneath the sleeve, and of sufficient number to approximately cover the inner surface of said sleeve.

* * * * *